United States Patent [19]

Toyokura

[11] Patent Number: 5,335,316
[45] Date of Patent: Aug. 2, 1994

[54] OUTPUT METHOD AND APPARATUS

[75] Inventor: Yoichi Toyokura, Yokohama, Japan

[73] Assignee: Canon Kabushiki Kaisha, Tokyo, Japan

[21] Appl. No.: 872,049

[22] Filed: Apr. 22, 1992

[30] Foreign Application Priority Data

Apr. 25, 1991 [JP] Japan .................................. 3-95347

[51] Int. Cl.$^5$ ........................ G06F 3/00; G06F 15/62
[52] U.S. Cl. ................................................ 395/115
[58] Field of Search ................ 395/102, 115, 116, 164

[56] References Cited

U.S. PATENT DOCUMENTS

| 4,058,674 | 11/1977 | Komura | 358/260 |
|---|---|---|---|
| 4,568,983 | 2/1986 | Bobick | 358/260 |
| 4,791,680 | 12/1988 | Yokoe et al. | 382/56 |
| 5,108,207 | 4/1992 | Isobe et al. | 395/115 X |
| 5,129,049 | 7/1992 | Cuzzo et al. | 395/113 |

FOREIGN PATENT DOCUMENTS

| 0218448 | 4/1987 | European Pat. Off. . |
| 0378316 | 7/1990 | European Pat. Off. . |
| 0416508 | 3/1991 | European Pat. Off. . |
| 0510923 | 10/1992 | European Pat. Off. . |
| 2414239 | 10/1974 | Fed. Rep. of Germany . |
| 2178826 | 7/1990 | Japan . |
| 1469433 | 4/1977 | United Kingdom . |

Primary Examiner—Robert L. Richardson
Attorney, Agent, or Firm—Fitzpatrick, Cella, Harper & Scinto

[57] ABSTRACT

An output apparatus receives print data from an external apparatus, analyzes the received print data, converts the analyzed print data into image data and stores the converted image data in a frame memory. The image data stored in the frame memory is checked and compressed in response to the check.

8 Claims, 9 Drawing Sheets

| DATA | FRAME NO. | OTHER INFORMATION |
|---|---|---|
| CHARACTER A | 1 | . . . |
| CHARACTER B | 5,6 | . . . |
| CHARACTER C | 6 | . . . |

|   | ADDRESS |
|---|---------|
| 0 | NULL    |
| 1 | 1000    |
| 2 | NULL    |
| 3 | NULL    |
| 4 | NULL    |
| 5 | 2000    |
| 6 | 3000    |
| 7 | NULL    |

OUTPUT METHOD AND APPARATUS

BACKGROUND OF THE INVENTION

1. Field of the Invention

The invention relates to an output method and apparatus for generating a pattern in accordance with data supplied from an external device such as a host computer or the like.

2. Related Background Art

Figure 2:
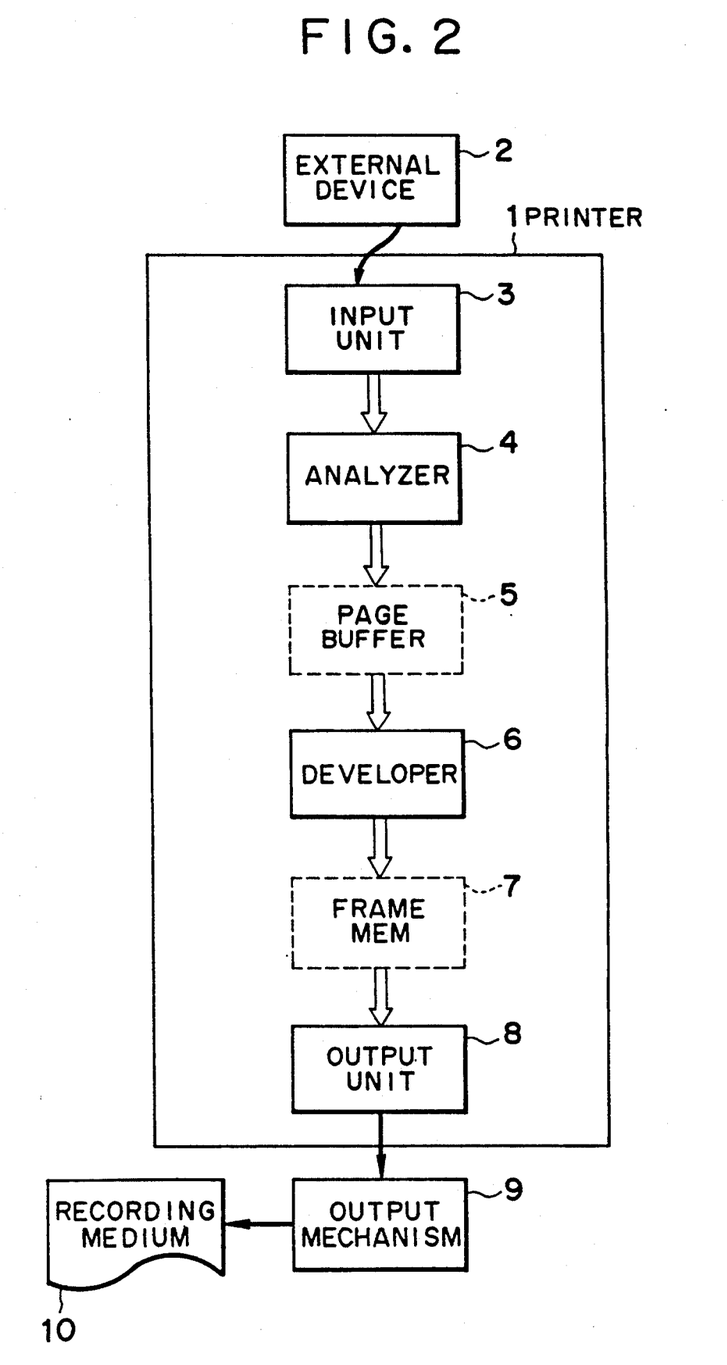
FIG. 2 is a diagram showing a flow of processes in a conventional printer.

FIG. 2 is a block diagram showing a flow of processes in a conventional printer 1.

In FIG. 2, reference numeral 2 denotes an external device such as a host computer or the like which generates print data; 3 an input unit which receives data; 4 an analyzer to analyze the input data; 5 a page buffer to store the result of the analysis; 6 a developer to develop data into an output image of a bit map memory or the like on the basis of the content in the page buffer 5; and 7 a frame memory to store the developed output image. The frame memory 7 comprises an RAM. Reference numeral 8 denotes an output unit to control an output mechanism 9 by, for instance, a laser beam or the like in accordance with the image stored in frame memory 7. Reference numeral 10 denotes a recording medium such as a paper or the like.

In the printer 1, the print data generated from the external device 2 is received by the input unit 3 for receiving the data, the analyzer 4 analyzes the received data, and data of a format to give an instruction to the developer 6, namely, the page buffer 5 is formed as a result of the analysis. The page buffer 5 is formed on a page unit basis and is sent to the developer 6 in a form including all of the information of one page. In accordance with the page buffer 5, the developer 6 forms an output image into the frame memory 7 in a form of, for example, a binary bit map memory of one page. In accordance with the frame memory, the output unit 8 records the result of the printing to the recording medium such as a paper or the like by, for instance, controlling a laser beam of the output mechanism 9.

In the above conventional apparatus, however, the frame memory for storing the output image must be reserved for an amount of data corresponding to one whole page, so that it is impossible to control the device so as to efficiently use the memory in accordance with the size of the output image. For instance, when a page of the A4 size is generated at a resolution of, e.g., 300 dpi (dots per inch), even in the case where only one point of a size of one dot is generated, it is necessary to fixedly reserve a frame memory of about one Mbyte which is necessary to store the output image of the whole page. Further, in the case of performing a color expression or a dark/light expression, such a problem becomes further serious.

SUMMARY OF THE INVENTION

In consideration of the above problems, it is an object of the invention to provide an output apparatus comprising means for dividing a necessary minimum portion on the basis of an output image in one page and for storing into a memory and means for generating the output image, as one page, which has been stored as divided portions.

In consideration of the above problems, another object of the invention is to provide an output method and apparatus in which by generating image data while dynamically reserving a frame memory in accordance with the size of the output image, a surplus memory can be allocated for other application fields.

DETAILED DESCRIPTION OF THE PREFERRED EMBODIMENT

The invention can be applied to an apparatus or a system comprising a plurality of apparatuses or can be also applied to the case where the invention is accomplished by supplying a program to an apparatus or a system.

Figure 1A:
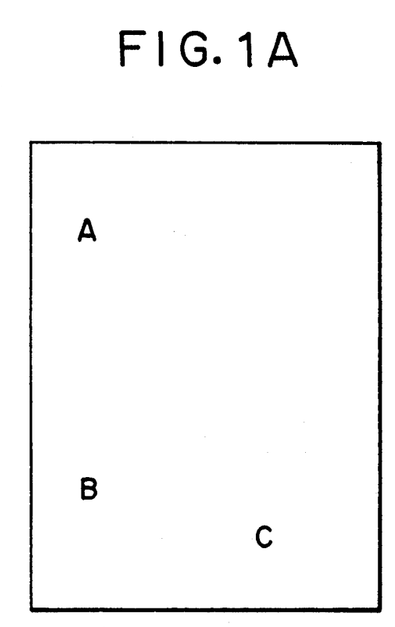
FIGS. 1A and 1B are diagrams showing a construction of a frame memory in an embodiment.
Figure 1B:
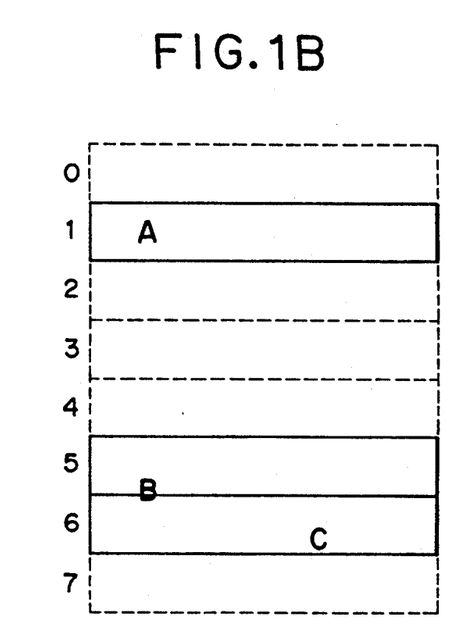

An embodiment of the present invention will now be described hereinbelow. For simplicity of explanation, the case of generating characters "A, B, C" into one page will be described. FIGS. 1A and 1B show a frame memory of one page which has hitherto been necessary to store such an output image.

In the embodiment, the frame memory of one page is divided into eight portions and the numbers 0 to 7 are given to those portions. Only the memories corresponding to Nos. 1, 5, and 6 are reserved as a frame memory as shown in FIG. 1B. Those numbers are hereinafter referred to as frame numbers.

Figure 3:
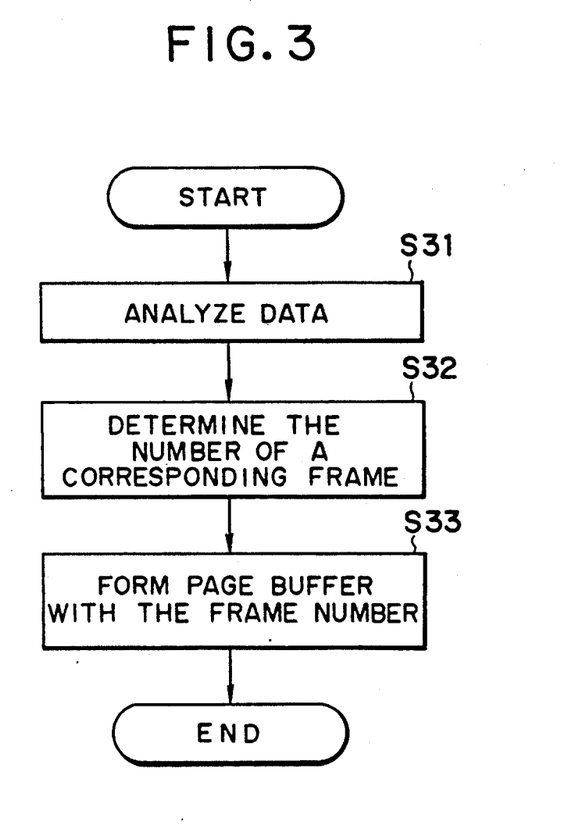
FIG. 3 is a flowchart showing processes in an analyzer in the embodiment.

FIG. 3 is a flowchart showing processes for one data which are executed by the analyzer 4 in the present embodiment of the invention. In the analyzer 4, the data is first analyzed in step S31 to determine the position and developing range (size of character in this case) where each data should be developed. The number of dividing portions of the frame memory is determined (0 to 7 in FIG. 1B).

In the next step S32, the memory into which the data should be developed is determined on the basis of the above information, that is, the number of frames in FIG. 1B into which the data should be developed is determined. For instance, it will be understood that in the case of a character "A", it can be developed in only an area of the frame No. 1 and, in the case of a character "B", areas of both of the frame Nos. 5 and 6 are needed. Due to this, a page buffer including the information of the corresponding frame number (in which data should be developed) is formed in step S33. In the case of data such as image or graphic data other than characters as well, the area (the number of dividing portions) in which data should be developed can be known by the data analysis in step S31. Consequently, the developing areas are classified into the case of two dividing portions, the case where the frame cannot be divided, the case of three dividing portions, or the like. In step S32, the number of frame in which data should be developed can be predetermined.

Figure 4:
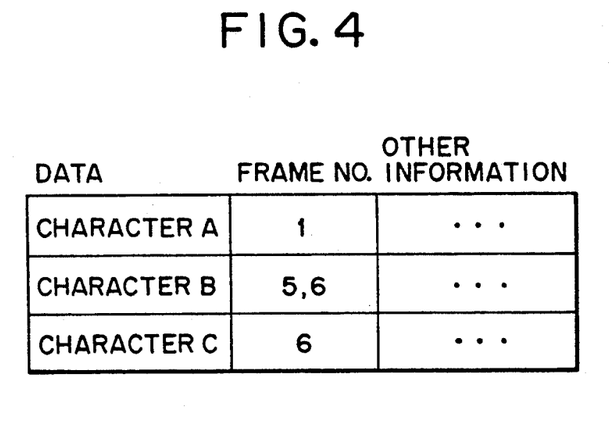
FIG. 4 is a diagram showing a page buffer in the embodiment.

FIG. 4 shows a page buffer according to the embodiment which has been formed by the analyzer 4. The information of the frame numbers such as (1), (5, 6), and (6) are respectively allocated to the characters "A", "B", and "C".

The frame is variably set on the basis of the necessary minimum partial area based on the output image.

Figure 5:
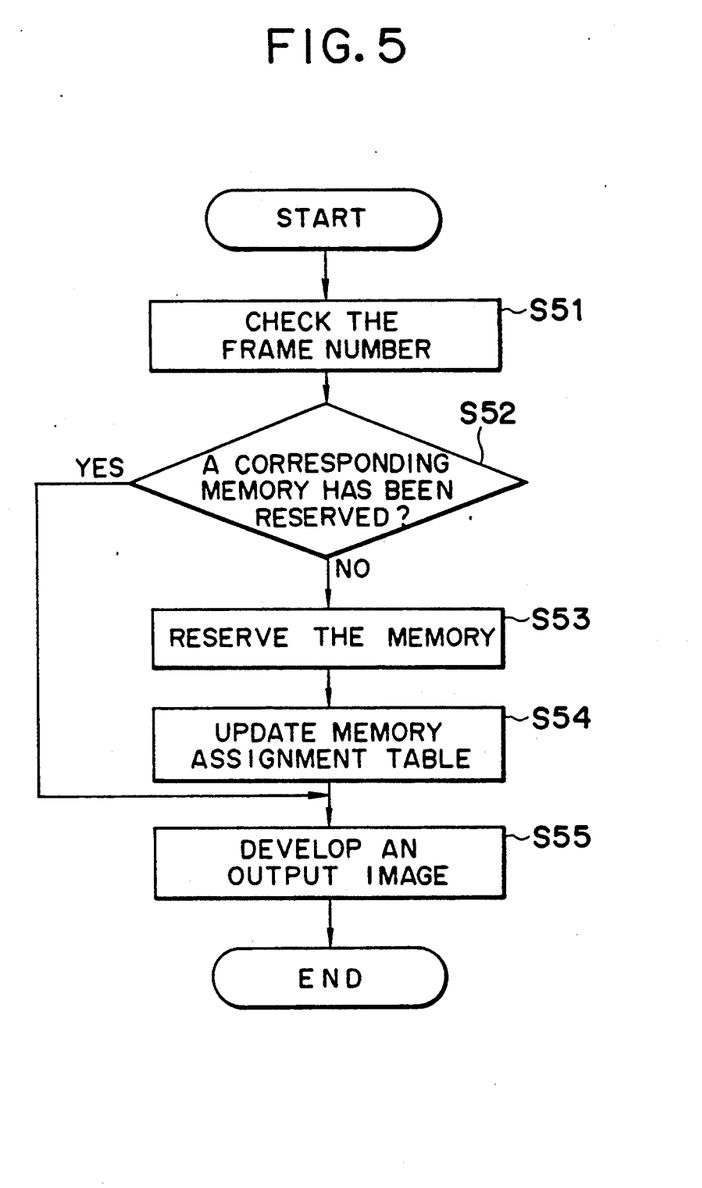
FIG. 5 is a flowchart showing processes in a developer in the embodiment.
Figure 6:
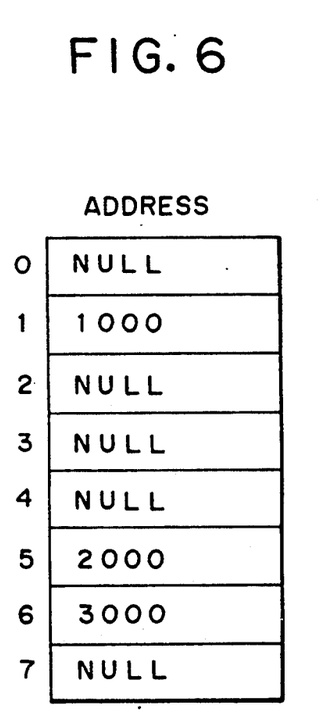
FIG. 6 is a diagram showing a memory assignment table in the embodiment.

FIG. 5 is a flowchart showing processes for one page buffer in the developer 6 in the present embodiment of the invention. In the developer 6, the frame number in the page buffer is first checked in step S51. A check is now made in step S52 to see if the memory corresponding to the frame number has already been reserved by using a table (hereinafter, referred to as a memory assignment table) showing the corresponding relation between the frame numbers and the assigned memories as shown in FIG. 6. "NULL" is set to the number of frame to which no memory is assigned. In the initial state, all of the frame numbers are set to "NULL". When the corresponding memory is not reserved in step S52, the memories which will be newly necessary are reserved in step S53. The addresses of the reserved memories are written into the memory assignment table in step S54. Step S55 follows. When the corresponding memory has been reserved in step S52, the output image is developed for the corresponding memory in step S55.

Figure 7:
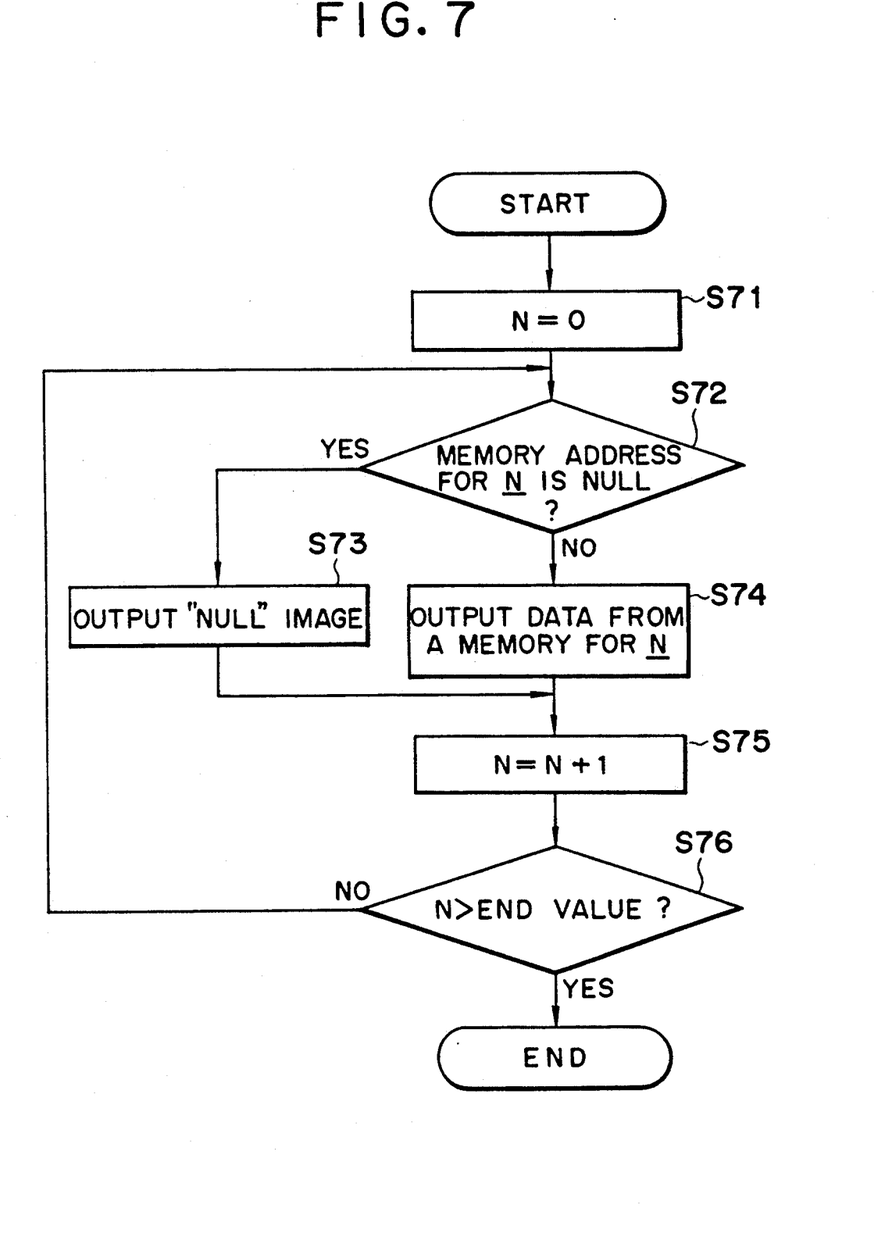
FIG. 7 is a flowchart showing processes in an output unit in the embodiment.

FIG. 7 is a flowchart showing output processes of one page which are executed by the output unit 8 in the present embodiment of the invention. In the output unit 8, the initial value "0" is first set to a variable N representing the processing frame number in step S71. In the next step S72, a check is made to see if the address in the memory corresponding to the frame number N is equal to "NULL" or not by referring to the memory assignment table. If it is "NULL", the NULL image is generated in correspondence to the above frame number or nothing is generated in step S73. Practically speaking, in the case of a laser beam printer, a process such that the laser beam is turned off during the generation of the image corresponding to the frame or the like is performed. After that, step S75 follows. When the corresponding memory address exists in step S72, an image corresponding to the frame is generated in step S74 by executing a conventional output control with reference to the corresponding memory. The processing routine advances to step S75. The variable N is increased by only +1 in step S75 and step S76 follows. A check is made in step S76 to see if the variable N exceeds an end value (7 in this case) or not. If the variable N is not larger than the end value, the processing routine is returned to step S72. When N is larger than the end value, the generation of this page is finished.

Figure 8:
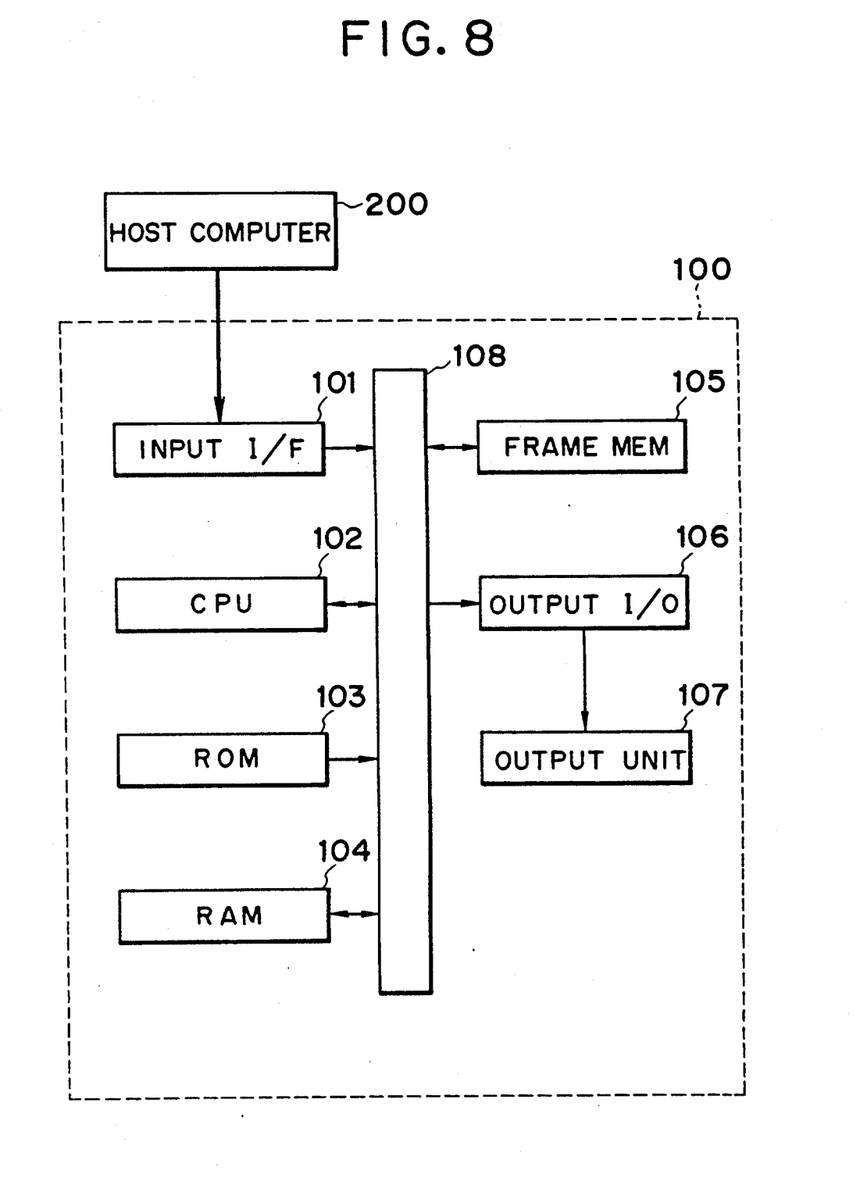
FIG. 8 is a practical constructional diagram of a printer according to an embodiment.

FIG. 8 shows a practical construction of a printer of the embodiment.

In the diagram, reference numeral 100 denotes a printer of the embodiment; 200 a host computer which generates print information; 101 an input interface which receives the print information from the host computer 200; 102 a CPU to control the whole printer 100; 103 an ROM to store an operation processing procedure (programs relating to flowcharts of FIGS. 3, 5, and 7 and the like) of the CPU 102, character font patterns, and the like; 104 an RAM which is used for storage such as for a work area of the CPU 102, reception buffer to store the print data received from the host computer 200, page buffer to construct an output image of one page from the received print information, or the like; 105 a frame memory into which the output image is developed and which is also constructed by an RAM; and 106 an output interface to generate the output image to an output unit 107 to actually print the output image. The above component elements are connected to a system bus 108.

According to the embodiment as described above, it is possible to control so as to generate the image data of one page while dynamically reserving the frame memory in accordance with the size of output image.

Another embodiment

As another embodiment, there is also considered a method whereby the analyzer 4 in the above embodiment executes the analyzing process in a manner similar to the conventional method, the developer 6 develops the image data of one whole page into the frame memory in a manner similar to the conventional method, the portions which are not used for development in the frame memory are checked, a memory assignment table is formed, and the portions which are not used are released. In such a case, although the frame memory of one whole page is temporarily necessary, only the same capacity as that in the above embodiment is used upon generation.

It is also considered to reserve the memory, namely, to form a memory assignment table by the developer 6.

Figure 9:
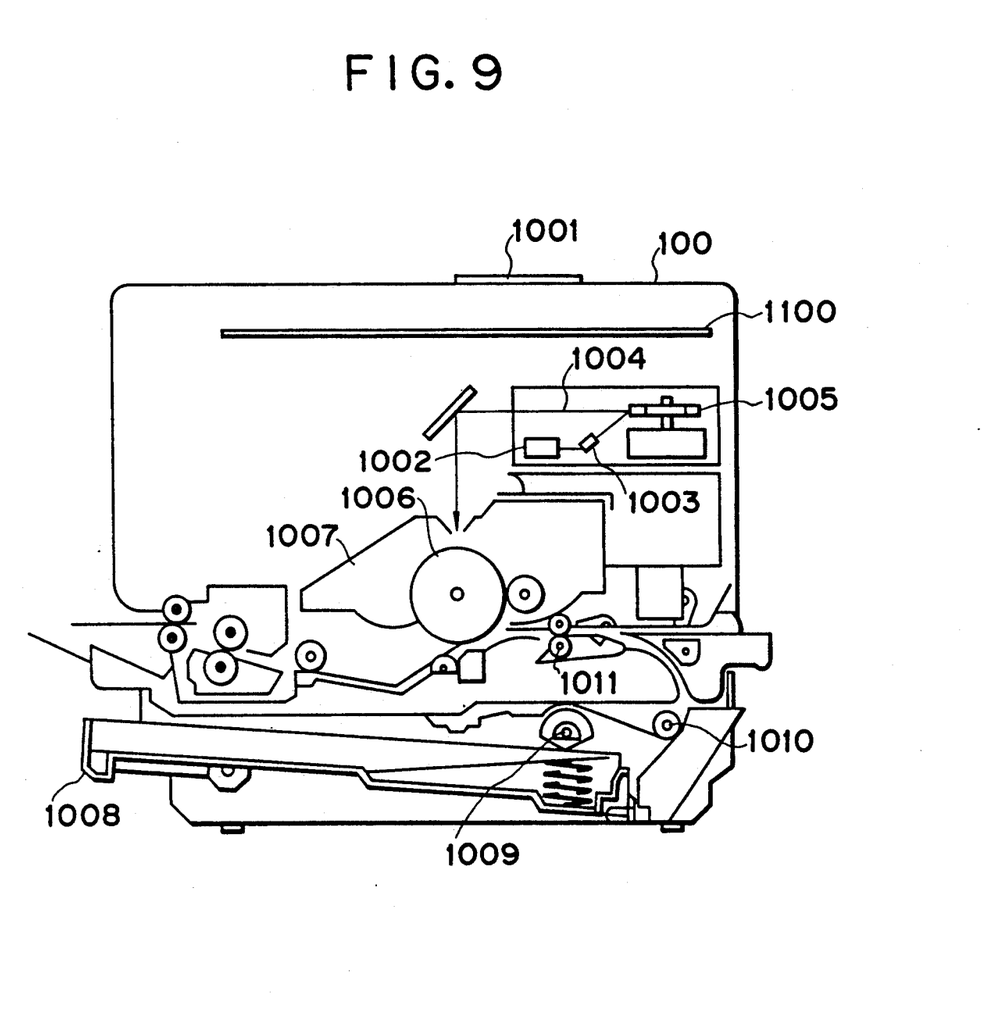
FIG. 9 is a structural diagram of a laser beam printer.

Description of laser beam printer (FIG. 9)

A construction of a laser beam printer 100 to which the invention can be applied will now be described with reference to FIG. 9.

FIG. 9 is a cross sectional view showing an internal structure of the laser beam printer (hereinafter, abbreviated to an LBP) of the embodiment. The LBP can register a character pattern, form data, or the like from a data source (not shown).

In the diagram, reference numeral 100 denotes the LBP main body which receives and stores character information (character code), form information, macro instruction, etc. which is supplied from the external device (2 in FIG. 1) connected to the LBP main body. The LBP main body 100 forms the corresponding character pattern, form pattern, etc. in accordance with the information and forms an image onto a recording paper used as a recording medium. Reference numeral 1001 denotes an operation panel on which switches for operation, an LED or LCD display, and the like are arranged. Reference numeral 1100 denotes a control section comprising the CPU 102 in FIG. 8 for controlling the whole LBP 100 and for analyzing the character information or the like which is supplied from the external device. The control section 1100 converts the character information or the like into the video signal of the corresponding character pattern and transfers it to a laser driver 1002.

The laser driver 1002 is a circuit to drive a semiconductor laser 1003 and on/off switches a laser beam 1004 which is emitted from the semiconductor laser 1003 in accordance with the input video signal. The laser beam 1004 is led to the right and left by a rotary polygon mirror 1005 and scans on an electrostatic drum 1006. Thus, an electrostatic latent image of a character pattern is formed onto the drum 1006. The latent image is developed by a developing unit 1007 arranged around the drum 1006 and, thereafter, the developed image is copy transferred to the recording paper. A cut sheet is used as a recording paper. The cut sheet recording papers are enclosed in a paper cassette 1008 attached in the LBP main body 100 and are picked up one by one and inserted into the apparatus and conveyed to the drum 1006 by a paper feed roller 1009 and conveying rollers 1010 and 1011.

According to the invention as described above, the frame memory can be dynamically reserved in accordance with the size of output image, so that the memory can be efficiently used in accordance with the size of output image in the page.

What is claimed is:

1. An output apparatus comprising:
   means for receiving print data from an external apparatus;
   means for analyzing the print data received by said receiving means;
   means for converting the analyzed print data into image data;
   a frame memory for storing therein the image data converted by said converting means;
   means for checking the image data stored in said frame memory; and
   means for compressing the image data stored in said frame memory in response to a check made by said checking means.

2. An output apparatus according to claim 1, wherein said checking means checks a portion of said frame memory, which portion is not used for data storage.

3. An output apparatus according to claim 2, wherein the frame memory portion is released for other uses.

4. An output apparatus according to claim 1, further comprising means for outputting the image data stored in said frame memory after a compression performed by said compressing means.

5. A method for outputting data, comprising the steps of:
   receiving print data from an external apparatus;
   analyzing the received print data in a frame memory;
   converting the analyzed print data into an image data;
   storing the converted image data in a frame memory;
   checking the stored image data; and
   compressing the stored image data in response to the checking performed in said checking step.

6. A method according to claim 5, wherein said checking step checks a portion of the frame memory, which portion is not used for data storage.

7. A method according to claim 6, wherein the frame memory portion is released for other uses.

8. A method according to claim 5, further comprising a step for outputting the stored image data after a compression performed by said s compressing step.

* * * * *